United States Patent [19]

Haag

[11] Patent Number: 5,112,920

[45] Date of Patent: May 12, 1992

[54] AMINE CONTAINING MONOMERS

[75] Inventor: Anthony P. Haag, Midland, Mich.

[73] Assignee: The Dow Chemical Company, Midland, Mich.

[21] Appl. No.: 492,007

[22] Filed: Mar. 12, 1990

[51] Int. Cl.$^5$ .................... C08F 4/48; C08F 297/02
[52] U.S. Cl. ..................................... 525/294; 526/173
[58] Field of Search ................ 525/294; 526/173

[56] References Cited

U.S. PATENT DOCUMENTS

| | | | |
|---|---|---|---|
| 3,144,429 | 8/1964 | Strobel | 260/45.5 |
| 4,311,799 | 1/1982 | Miyake et al. | |
| 4,409,120 | 10/1983 | Martin | 525/280 |
| 4,835,216 | 5/1989 | Morikawa et al. | 525/77 |

FOREIGN PATENT DOCUMENTS 55-11523  1/1980  Japan .

OTHER PUBLICATIONS

March, J.; "Advanced Organic Chem.", 1968, p. 161.
CA 107(8):59584z, Abstract of Nabeshima et al.; Polymer J. (Tokyo) 1987, 19(5), pp. 593–601.
G. Odian, Principles of Polymerization, 1981 pp. 372, 374, 398 and 399.

Primary Examiner—Melvyn I. Marquis
Assistant Examiner—Vasu S. Jagannathan

[57] ABSTRACT

Ethylenically unsaturated diamine or triamines, a process for their polymerization and polymeric products. The resulting polymers have unique properties as chelants for metal ions.

7 Claims, No Drawings

AMINE CONTAINING MONOMERS

BACKGROUND OF THE INVENTION

The present invention relates to certain novel diamine or triamine functional ethylenically unsaturated polymerization compounds. More particularly the present invention relates to such compounds wherein the amine functionally is devoid of active hydrogen groups. Such nonprotic amine compounds may be polymerized by any suitable technique to provide polymers with pendant diamine or triamine functionality.

In U.S. Pat. No. 4,311,799 crosslinked copolymers containing substituted aminoethyl groups are disclosed. The reference discloses that further substituents for the aminoethyl group include aminoalkyls.

In CA 107(8): 59584z and JP 80-11523 polymers of N,N'-diethyl-N-(4-vinylphenethyl)ethylene diamine are disclosed. Because of the existence of an active terminal hydrogen moiety, such monomers are unsuited for use in anionic polymerization processes.

U.S. patent application Ser. No. 352,670, filed May 9, 1989, and assigned to the same assignee as the present application disclosed novel amine containing anionic initiator systems which result in the preparation of block copolymers having narrow molecular weight distribution. The amines employed in such systems were not polymerizable.

Telechelic and block copolymers are well known in the art and are employed for a variety of purposes. Of the block copolymers, those having the configuration AB(BA)$_n$ wherein n has a value of from about 1-10, particularly 1, that is block copolymers having a simple ABA, configuration are highly important items of commerce for use in adhesives and as elastomers. The A block is preferably an olefin polymer, especially a styrene homopolymer or copolymer. Usually the B block is an elastomeric polymer, especially a polymer of a diene such as a polymer of butadiene or isoprene. To obtain block copolymers of maximum uniformity, it is usually desirable to initiate polymerization employing a multifunctional lithium compound. In the case of an ABA block copolymer (i.e., a triblock copolymer), a difunctional compound would be employed. In the case of an AB(BA)$_3$ block copolymer, a tetrafunctional initiator would be utilized, etc.

Anionic polymerization is well known in the art, for example U.S. Pat. Nos. 4,431,777 and 4,427,837 disclose suitable anionic polymerization processes. Multifunctional initiators are well known and have been previously used in polymerizations. Such initiators and their use are shown in the following U.S. Pat. Nos.: 4,169,115; 4,172,100; 4,172,190; 4,427,837; 4,196,154; and 4,205,016. The teachings of the preceding patents are incorporated herein by reference thereto.

Particularly desirable multifunctional lithium containing compounds are selected from the group consisting of the formula:

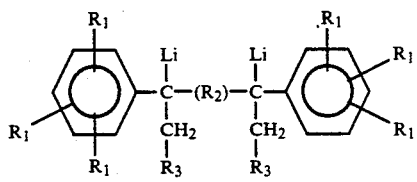

wherein
- $R_1$ is independently each occurrence hydrogen or an inert radical having from 0 to 16 carbon atoms;
- $R_2$ is a divalent organic radical having at least 6 carbon atoms, $R_2$ having at least one aromatic ring and the aromatic ring being directly attached to a carbon which is attached to an aromatic ring of the above formula;
- $R_3$ is independently each occurrence selected from the group consisting of alkyl, cycloalkyl, aromatic, mixed alkyl/aromatic, and mixed cycloalkyl/aromatic radicals containing from 1 to 20 carbon atoms.

Especially preferred are initiating compounds of the formula:

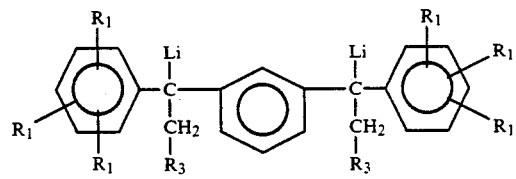

wherein $R_1$ and $R_3$ are as previously defined.

By the term "inert" as used in this context is meant substituents that do not interfere with the desired anionic polymerization. In a most preferred embodiment, $R_1$ is selected from the group consisting of hydrogen, alkyl, cycloalkyl, alkoxy, aryl and mixtures thereof. Specific examples of difunctional initiators (DFIs) corresponding to the above formula are 1,3-phenylene bis (3-methyl-1-phenylpentylidene)bis(lithium), 1,3-phenylene bis (3-methyl-1-(4-methylphenyl)pentylidene) bis(lithium), 1,3-phenylene bis (3-methyl-1-(4-ethylphenyl)-pentylidene) bis(lithium), 1,3-phenylene bis (3-methyl-1-(4-(1,1-dimethylethyl)phenyl) pentylidene) bis(lithium), and 1,4-phenylene bis(3-methyl-1-(4-dodecylphenyl)-pentylidene) bis(lithium).

SUMMARY OF THE INVENTION

According to the present invention there are provided novel ethylenically unsaturated diamine or triamine compounds corresponding to the formula:

$$CH_2=CR-R'+NR''-R')_{\overline{n}}N(R'')_2 \quad (I)$$

wherein
- R is hydrogen or $C_{1-4}$ alkyl;
- R' independently each occurrence is a $C_{2-20}$ difunctional organic group;
- R" independently each occurrence is a $C_{1-20}$ hydrocarbyl group or an inertly substituted derivative thereof; and
- n is one or two.

In a further embodiment of the present invention, there is provided a process for the polymerization of an anionically polymerizable monomer mixture comprising an ethylenically unsaturated diamine or triamine compound according to formula I, and a copolymerizable comonomer, the steps of the process comprising forming a living polymer anion by contacting the copolymerizable comonomer with a lithium containing organic compound under anionic polymerization conditions, contacting the living polymer anion with the ethylenically unsaturated diamine or triamine compound, terminating the polymerization and recovering the polymer.

The ethylenically unsaturated diamine or triamine is preferably employed in the anionic polymerization in an amount that is effective to provide metal chelation functionality in the resulting polymer. Preferably from 0.001 to 50 percent by weight, more preferably from 0.1 to 2 percent by weight based on total monomer weight.

Also contemplated within the scope of the present invention is a polymer comprising in polymerized form the above ethylenically unsaturated diamine or triamine and a copolymerizable comonomer.

Although the process of the present invention is particularly desirably practiced with the previously mentioned difunctional anionic initiators, it is to be understood that any lithium organyl anionic initiator compound may be utilized in the present process. Examples include the well known $C_{1-6}$ alkyl lithiums such as sec-butyl lithium.

The products are usefully employed as adhesives and molding resins. The polymers may also be employed in order to chelate metal ions and extract the same from aqueous solutions.

DETAILED DESCRIPTION OF THE INVENTION

Preferred diamine or triamine compounds are vinylaromatic compounds, i.e., those corresponding to the formula:

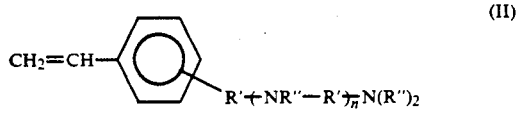

(II)

wherein R, R', R", and n are as previously defined. Most preferred diamine or triamine compounds are those of formula (II) wherein R' is independently each occurrence $C_{2-6}$ alkylene and R" independently each occurrence is $C_{1-4}$ alkyl.

By the term inert substituent as employed herein is meant a substituent which does not alter the ability of the ethylenically unsaturated anionically polymerizable diamine or triamine to function as stated according to the present invention. Examples include silyl or other similar substituents.

In polymerized form the above monomers generate a polymeric repeating unit corresponding to the formula:

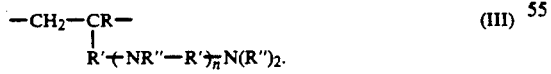

(III)

wherein R, R', R" and n are as previously defined.

Suitable copolymerizable comonomers include any copolymerizable ethylenically unsaturated comonomer. Examples include dienes particularly conjugated dienes, preferably 1,3-butadiene, isoprene and mixtures thereof. Additional suitable comonomers include olefins, preferably alkenyl aromatic monomers. By the term alkenyl aromatic monomer is meant a monomer of the formula:

where n is an integer from 0 to 3, $R_4$ is an alkyl radical containing up to 5 carbon atoms and $R_5$ is hydrogen or methyl. Preferred alkenyl aromatic monomers are styrene, vinyl toluene (all isomers, alone or in admixture), α-methylstyrene, and mixtures thereof. Particularly preferred alkenyl aromatic monomers are styrene and mixtures of styrene and α-methylstyrene.

The quantity of anionically polymerizable diamine or triamine compound employed is generally from 0.0001 to 50 percent, preferably from 0.1 to 2 percent.

Solvents useful for the practice of the present invention are inert hydrocarbons or mixtures of hydrocarbons, including an excess of one or more of the monomers employed in the polymerization. For example, excess α-methylstyrene may be employed in the preparation of block copolymers containing a styrene/α-methylstyrene copolymer as the olefin polymer block. Preferred solvents are pentane, isopentane, cyclopentane, hexane, cyclohexane, toluene, and mixtures thereof.

The polymerization may be conducted at a wide range of temperatures. Preferred temperatures are from about 0° C. to about 160° C., most preferably from about 20° C. to about 120° C. After polymerization to the desired degree is attained, the living polymer is terminated by addition of a polar compound such as an alcohol or water. The polymer may be recovered by any suitable separation or devolatilization techniques. Copolymers having separate blocks of the polymerizable amine compound are readily prepared by controlling the order of addition of monomers according to known techniques. Generally however the polymerizable amine in added to the reactor after substantially complete polymerization of the copolymerizable comonomer in order to provide functionalized polymers bearing the amine substituent on the chain ends. Such block copolymers are particularly desirable where further derivatives of the functionalized polymers of the invention are desired or wherein separate domains within the resulting polymer are desired.

Although the invention has been explained with respect to an anionic polymerization, the skilled artisan will appreciate that traditional free radical polymerization techniques may also be employed to prepare the desired copolymers.

The invention is further illustrated but not limited by the following examples. Unless stated to the contrary parts and percentages are based on weight.

EXAMPLE 1

Preparation of N-[(3- and 4-vinylphenyl)methyl]-N,N',N'-trimethylethylenediamine Vinylbenzyl chloride (50.0 g, 1.0 eq, mixture of meta and para isomers) was continuously added over 1.2 h to 69.1 g of N,N,N'-trimethylethylenediamine (2.0 eq) at ambient temperature under a nitrogen atmosphere. Toluene (40 mL) was also added after 40 min to reduce the viscosity. After 3 h, agitation was stopped and the reaction mixture was allowed to stand overnight. After stirring with 13 g of NaOH in 90 mL of water, phases were separated and the aqueous layer was extracted with 40 mL of toluene. The organic layer was washed with 50 mL of water, concentrated in vacuo, and yielded 52.11 g of yellow liquid. Distillation through a 1×8 cm Vigreux column with a 1:1 reflux afforded 35.99 g of colorless liquid, bp 120°-2°/2 mm Hg. Capillary GC analysis showed >99 percent purity of the two isomeric products in a ratio of 3:1. $^1$H-NMR confirmed the product's identity as a mixture of N-[(3-vinylphenyl)methyl]-N,N',N'-trimethylethylenediamine and N-[(4-vinylphenyl)methyl]-N,N',N'-trimethylethylenediamine.

EXAMPLE 2

Preparation of N-[3-(3- and 4-vinylphenyl)propionyl]N,N',N'-trimethylethylenediamine N-Acetyl-N,N',N'-trimethylethylenediamine intermediate was prepared in the following manner. N,N,N'-Trimethylethylenediamine (24.5 g, 0.24 mol) was added to acetic anhydride (38 mL, 0.40 mol) over 1.5 hours with cooling in an ice-water bath. After stirring another 22 hours at ambient temperature, the reaction mixture was diluted with 50 mL of ether and 25 mL of water, and then cooled in an ice-water bath. A solution of 25 percent aqueous NaOH was added until the pH was approximately 10 and the phases were separated. The aqueous phase was extracted two more times with ether and the combined organic phase was concentrated on the rotary evaporator (50°, >100 mm Hg). Yield=2.4 g. The aqueous phase was saturated with NaCl and extracted again with methylene chloride (3×25 mL). After evaporation, it gave a total of 33.4 g of yellow liquid. Distillation through a 1×8 cm Vigreux column afforded 23.53 g of colorless liquid, bp 90°-1°/7 mm Hg (68 percent yield).

A solution of 10.1 g of diisopropylamine 0.100 mol, distilled from CaH$_2$ in 600 mL of THF (distilled from potassium/benzophenone ketyl) was cooled to −65° under a nitrogen atmosphere and then 40.4 mL of n-BuLi solution (2.5M in hexane, 0.10 mol) was added. This colorless solution was stirred for twenty minutes, the cooling bath removed, and the temperature allowed to increase to −50°. A solution of 14.4 g of N-acetyl-N,N',N'-trimethylethylenediamine in 20 mL of THF was added via syringe over ten minutes. This colorless solution was stirred another 40 minutes and the temperature was allowed to rise to −11°. A solution of 6.10 g of vinylbenzyl chloride (0.0400 mol, mixture of meta and para-isomers) in 140 mL of THF was added over 15 minutes. The reaction temperature increased gradually to 20° over the next two hours when the reaction was diluted with 20 mL of water and stripped on the rotary evaporator at 45°. The residue was partitioned between 30 mL of ether and 50 mL of water. The organic layer was washed with 50 mL of water and the combined aqueous phase was washed with 30 mL of ether. The ether layers were combined and a few milligrams of t-butylcatechol was added. After storing at 0° for two days, the ether solution was decanted from some precipitated ice and then stripped on the rotary evaporator at 40°. The resulting pale yellow oil, weighing 10.71 g, was stored at 0°. Capillary GC analysis showed a 3:1 ratio of amide isomers, totaling 97 area percent purity. $^1$H an d$^{13}$C-NMR analyses were consistent with the proposed structures.

EXAMPLE 3

Preparation of N-[3-(3- and 4-vinylphenyl)-propyl]N,N',N'-trimethylethylenediamine A slurry of 3.6 g of lithium aluminum hydride in 100 mL of dry THF was stirred at −15° under a nitrogen atmosphere. A solution of 9.52 g of N-[3-(3- and 4-vinylphenyl)propionyl-N,N',N'-trimethylethylenediamine in 20 mL of THF was added over 1.5 h. The reaction mixture was then allowed to gradually warm to 25° over the next 4 h. The temperature was reduced to −5° and another 0.62 g of LiAlH$_4$ was added. The reaction mixture was again allowed to warm to 25° over 1 h and then gradually transferred into 100 mL of cold ethyl acetate. Water and ice (300 mL) were gradually added and then the phases were separated. The aqueous phase was extracted with another 100 mL of ethyl acetate and the combined organic phase was washed with 50 mL of water. After addition of a spatula tip full of t-butylcatechol the reaction mixture was concentrated under reduced pressure at 45° to give 6.14 g of pale yellow liquid. A 4.00 g portion was flash distilled through a "short path" distillation head to give 1.07 g of colorless liquid (bp 108°-177°/0.4 mm Hg). Capillary GC analysis showed a 55:42 isomer ratio of the desired amine product, totaling 96 area percent purity. $^1$H and $^{13}$C-NMR analysis confirmed the product's identity.

EXAMPLE 4

Preparation of Styrene/Isoprene/N-(3-vinylphenylmethyl)-N,N',N'-trimethylethylenediamine-N-(4-vinylphenylmethyl-N,N',N'-trimethylethylenediamine Copolymer The difunctional initiator (DFI) solution is prepared by adding 54 ml of a cyclohexane solution containing 76.57 mmole of sec-butyllithium to a 500 ml stainless steel tube which contained 38.32 mmole of 1,3-bis(1-phenylethenyl)benzene in 426 ml of toluene under nitrogen. The resulting solution contains 0.074 mmole of active DFI, 1,3-phenylene-bis(3-methyl-1-phenylpentylidene) bis(lithium), per ml of solution.

A center block comprising polyisoprene is polymerized by contacting 2.0 g of purified isoprene with the above DFI solution in toluene solvent at 45°. After substantially complete conversion of the isoprene, 3.75 g of purified styrene monomer is added to the reactor by syringe. After 45 minutes reaction time, 0.05 g of a mixture of N-(3-vinylphenylmethyl)N,N',N'-trimethylethylenediamine and N-(4-vinylphenylmethyl)-N,N',N'-trimethylethylenediamine is added to the reactor. The resulting polymer containing diamine functionality in the styrene terminal block portion of the polymer is recovered by terminating with methanol and devolitilizing.

What is claimed is:

1. A process for the polymerization of an anionically polymerizable mixture comprising an ethylenically unsaturated anionically polymerizable diamine or triamine corresponding to the formula:

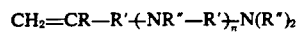

wherein
R is hydrogen or C$_{1-4}$ alkyl;
R' independently each occurrence is a C$_{2-20}$ difunctional organic group;

R" independently each occurrence is a $C_{1-20}$ hydrocarbyl group or an inertly substituted derivative thereof; and n is one or two;

and a copolymerizable comonomer the steps of the process comprising forming a living polymer anion by contacting the copolymerizable comonomer with a lithium containing organic compound under anionic polymerization conditions, contacting the living polymer anion with the ethylenically unsaturated diamine or triamine compound to generate a polymeric repeating unit corresponding to the formula:

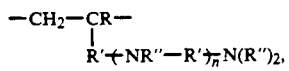

terminating the polymerization and recovering the polymer containing pendant diamine or triamine functionality.

2. A process according to claim 1 wherein the lithium containing organic compound is a difunctional lithium initiator corresponding to the formula

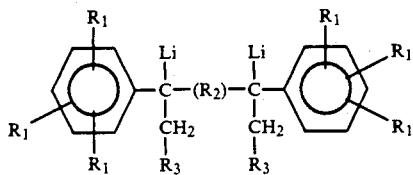

wherein $R_1$ is independently each occurrence hydrogen or an inert radical having from 0 to 16 carbon atoms;

$R_2$ is a divalent organic radical having at least 6 carbon atoms, $R_2$ having at least one aromatic ring and the aromatic ring being directly attached to a carbon which is attached to an aromatic ring of the above formula;

$R_3$ is independently each occurrence selected from the group consisting of alkyl, cycloalkyl, aromatic, mixed alkyl/aromatic, and mixed cycloalkyl/aromatic radicals containing from 1 to 20 carbon atoms.

3. A process according to claim 1 wherein the diamine or triamine comprises from 0.001 to 50 percent of the reaction mixture.

4. A process according to claim 3 wherein the copolymerizable comonomer is selected from the group consisting of conjugated dienes, alkenyl aromatic monomers and mixtures thereof.

5. A process according to claim 4 wherein the copolymerizable monomer is styrene.

6. A process according to claim 1 wherein the anionically polymerizable diamine or triamine corresponds to the formula:

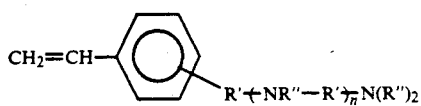

wherein

R is hydrogen or $C_{1-4}$ alkyl;

R' independently each occurrence is a $C_{2-6}$ alkylene;

R" independently each occurrence is a $C_{1-4}$ alkyl group; and n is one or two.

7. A process according to claim 6 wherein the diamine or triamine is N-[(3-vinylphenyl)methyl]-N,N',N'-trimethylethylenediamine, N-[(4-vinylphenyl)methyl]-N,N',N'-trimethylethylenediamine, N-[3-(3-vinylphenyl)propyl]-N,N',N'-trimethylethylenediamine, N-[3-(4-vinylphenyl)propyl]-N,N',N'-trimethylethylenediamine, or a mixture thereof.

* * * * *